(12) United States Patent
Gomilko et al.

(10) Patent No.: US 9,407,720 B2
(45) Date of Patent: Aug. 2, 2016

(54) DIRECT FILE TRANSFER WITHOUT SENDING REQUESTED FILE THROUGH REQUESTING DEVICE

(71) Applicants: SONY CORPORATION, Tokyo (JP); SONY DADC US INC., Terra Haute, IN (US)

(72) Inventors: Andrii Gomilko, Santa Monica, CA (US); David Anthony VanHaaster, Lakewood, CA (US); Andrew Marc Shenkler, Marina del Rey, CA (US)

(73) Assignees: SONY DADC US INC., Terra Haute, IN (US); SONY CORPORATION, Tokyo (JP)

( * ) Notice: Subject to any disclaimer, the term of this patent is extended or adjusted under 35 U.S.C. 154(b) by 261 days.

(21) Appl. No.: 13/786,722

(22) Filed: Mar. 6, 2013

(65) Prior Publication Data

US 2013/0268864 A1    Oct. 10, 2013

Related U.S. Application Data

(60) Provisional application No. 61/621,121, filed on Apr. 6, 2012.

(51) Int. Cl.
*G06F 3/0486* (2013.01)
*H04L 29/08* (2006.01)

(52) U.S. Cl.
CPC ............. *H04L 67/32* (2013.01); *G06F 3/0486* (2013.01); *H04L 67/06* (2013.01); *H04L 29/08* (2013.01)

(58) Field of Classification Search
CPC ........ G06F 3/048; G06F 3/0486; H04L 29/08

USPC .................................................... 715/748, 724
See application file for complete search history.

(56) References Cited

U.S. PATENT DOCUMENTS

| | | | |
|---|---|---|---|
| 5,870,552 A * | 2/1999 | Dozier et al. | 709/219 |
| 6,457,109 B1 | 9/2002 | Mililo et al. | |
| 2002/0059189 A1 | 5/2002 | Hanes et al. | |
| 2003/0130964 A1* | 7/2003 | Hudson | 705/404 |
| 2004/0070608 A1 | 4/2004 | Saka et al. | |
| 2005/0138554 A1* | 6/2005 | Bell et al. | 715/530 |
| 2006/0123406 A1 | 6/2006 | Sudhi et al. | |
| 2008/0027987 A1 | 1/2008 | Arora et al. | |
| 2009/0300522 A1* | 12/2009 | Haynes | G06F 17/24 715/762 |
| 2011/0040728 A1 | 2/2011 | Akirav et al. | |
| 2011/0238450 A1 | 9/2011 | Maresh et al. | |
| 2012/0096172 A1 | 4/2012 | Tyukasz et al. | |

OTHER PUBLICATIONS

Bryan Ford, Pyda Srisuresh, Dan Kegel, "Peer-to-Peer Communication Across Network Address Translators", http://arxiv.org/pdf/cs10603074v1.pdf, Mar. 18, 2006.
Andrew Biggadike, Daniel Ferullo, Geoffrey Wilson, Adrian Perri, "NATBLASTER: Establishing TCP Connections Between Hosts Behind NATs", https://sparrow.ece.cmu.edu/group/pub/old-pubs/natblaster.pdf SIGCOMM Asia Workshop 2005 Beijing, China.

* cited by examiner

*Primary Examiner* — Andrea Leggett
(74) *Attorney, Agent, or Firm* — Chip Law Group

(57) ABSTRACT

A requesting device can browse global file repositories and select a file in a source to be copied to a target directly without having to pass the file through the requesting device. A servlet-established controller can manage and monitor the process.

20 Claims, 4 Drawing Sheets

DIRECT FILE TRANSFER WITHOUT SENDING REQUESTED FILE THROUGH REQUESTING DEVICE

This application claims priority to U.S. provisional application Ser. No. 61/621,121, filed Apr. 6, 2012.

FIELD OF THE INVENTION

The present application relates generally to direct file transfers between repositories without sending requested files through the requesting device.

BACKGROUND OF THE INVENTION

When a requesting device is used to browse global storage pools for content and to choose a function to enact such as copying a file from one remote storage pool to another remote storage pool, a user of the requesting device can "drag and drop" the file represented in an index from one storage location to another. This causes the file to be pushed back to the requesting device, which then facilitates the file transfer to the target location. As understood herein, such a transfer method consumes computing resources on the requesting device, including storage and bandwidth.

SUMMARY OF THE INVENTION

Accordingly, a device includes a computer processor, a display controlled by the processor, and a computer readable storage medium accessible to the processor and bearing instructions which when executed by the processor to cause the processor to execute a web interface to browse content files on a source repository and a target repository. The repositories are geographically separate from each other. The processor receives a user command to copy or transfer a content file on the source repository to the target repository, and responsive to the command, sends to a controller a message to transfer the content file on the source repository to the target repository. The controller communicates with respective remote agents executing on the source repository and target repository to cause the content file to be transferred or sent directly from the source repository to the target repository without the content file being sent to the requesting device.

In some embodiments the remote agents are attached to content files stored on the repositories. Control messages to effect transfer or copying of the content file are sent from the web interface of the requesting device to the controller module, which may be implemented as a servlet. The controller can be implemented on the requesting device or on another device. Only control information need be exchanged between the web interface of the requesting device and the controller, with the content file to be transferred not being exchanged between the controller and the requesting device.

In another aspect, a method includes, responsive to a command including an address of a target repository from a requesting device to execute a function on a content file implicating a source repository and the target repository, sending a message to a remote agent of the source repository. The message commands the remote agent of the source repository to execute the function on the content file. Also, the message causes the remote agent to open a direct communication path to the target repository, bypassing the requesting device. The function is executed between the source repository and target repository without passing through the requesting device.

In another aspect, a requesting device includes a computer processor, a display controlled by the processor, and a computer readable storage medium accessible to the processor and bearing instructions which when executed by the processor to cause the processor to present on the display a user interface (UI). The UI is configured to enter a command to copy or transfer a file from a source repository to a target repository without the file being communicated to the requesting device.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
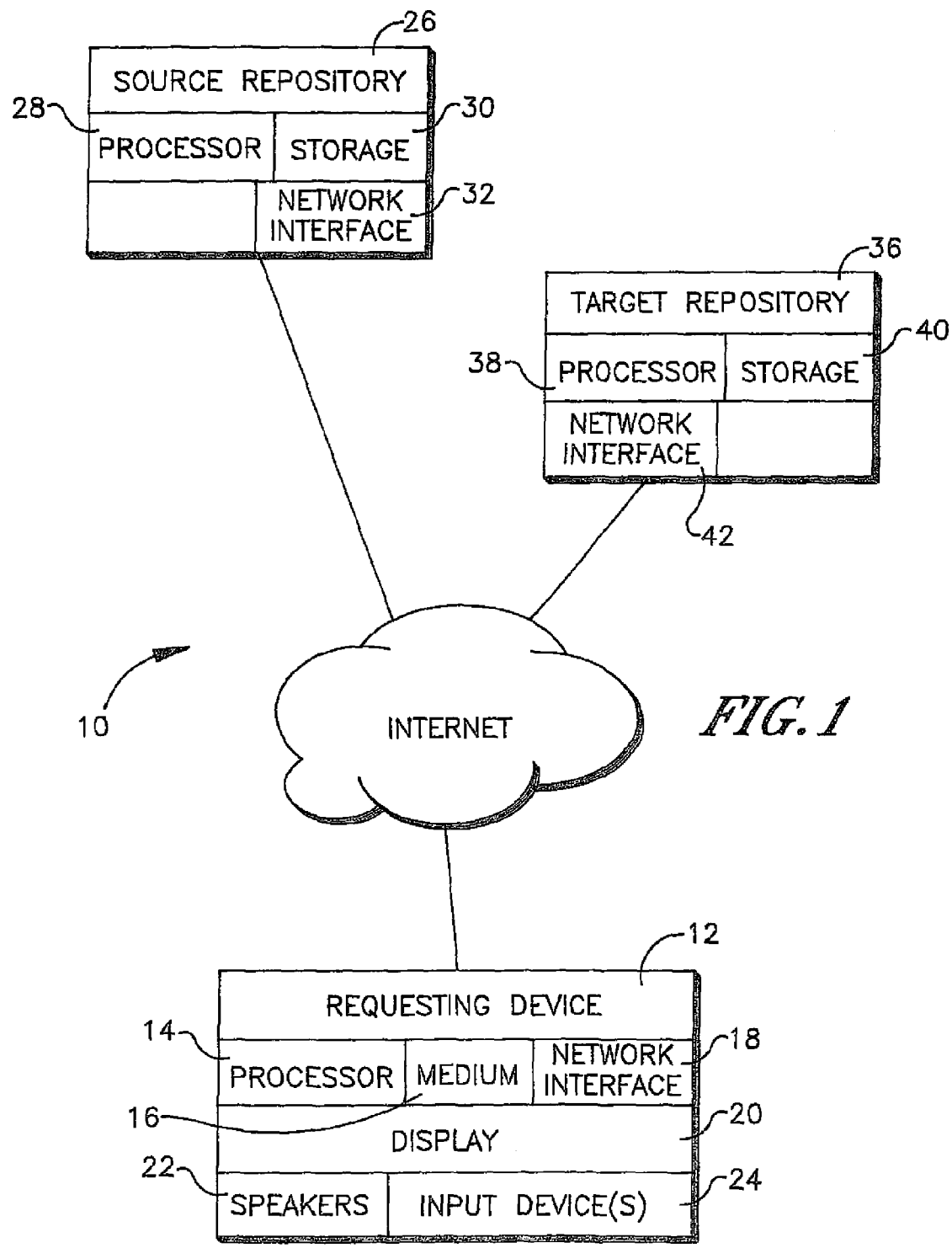
FIG. 1 is a block diagram of an example system in accordance with present principles.

Referring initially to FIG. 1, a system 10 includes a requesting device 12 that without limitation may be implemented by a PC, laptop, or notebook computer, a slate computer, a TV, a home entertainment controller, a game console, a personal digital assistant, a wireless telephone, etc. The device 12 may include a processor 14 accessing a disk-based or solid state computer readable storage medium 16 to execute logic for undertaking present principles. The processor 14 may communicate with other devices in the system 10 through one or more transceivers 18 (only one transceiver shown for clarity), which may be a wireless transceiver such as but not limited to WiFi transceiver, Bluetooth transceiver, wired or wireless modem, and the like. The device 12 may further include a display 20 and speakers 22 for presenting visual and/or audio data to a human user, and one or more input devices 24, such as a keypad with point and click device, e.g., a mouse, and/or touch screen capability within the display 20.

A source repository 26 that may be implemented by a server or other computing apparatus may include one or more processors 28 accessing one or more storage devices 30 to store content files thereon. The source repository 26 may use one or more computer transceivers 32 to communicate with the Internet 34, with which the requesting device 12 may also communicate.

A target repository 36 that may be implemented by a server or other computing apparatus may include one or more processors 38 accessing one or more storage devices 40 to store content files thereon. The target repository 36 may use one or more computer transceivers 42 to communicate with the Internet 34. The repositories 26, 36 are physically separated from each other and may indeed be physically located on different continents.

Figure 2:
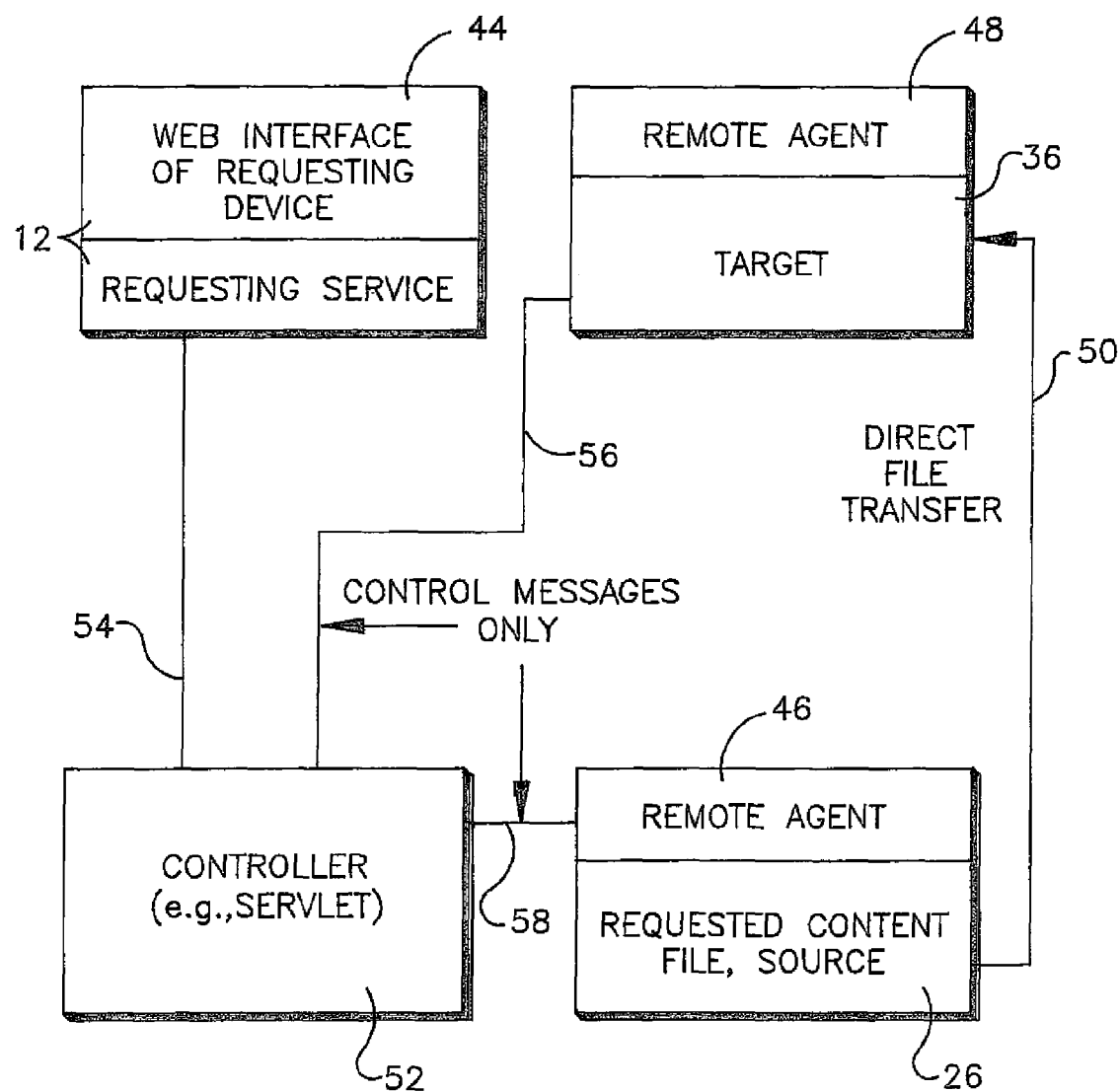
FIG. 2 is a diagram showing example software architecture.
Figure 3:
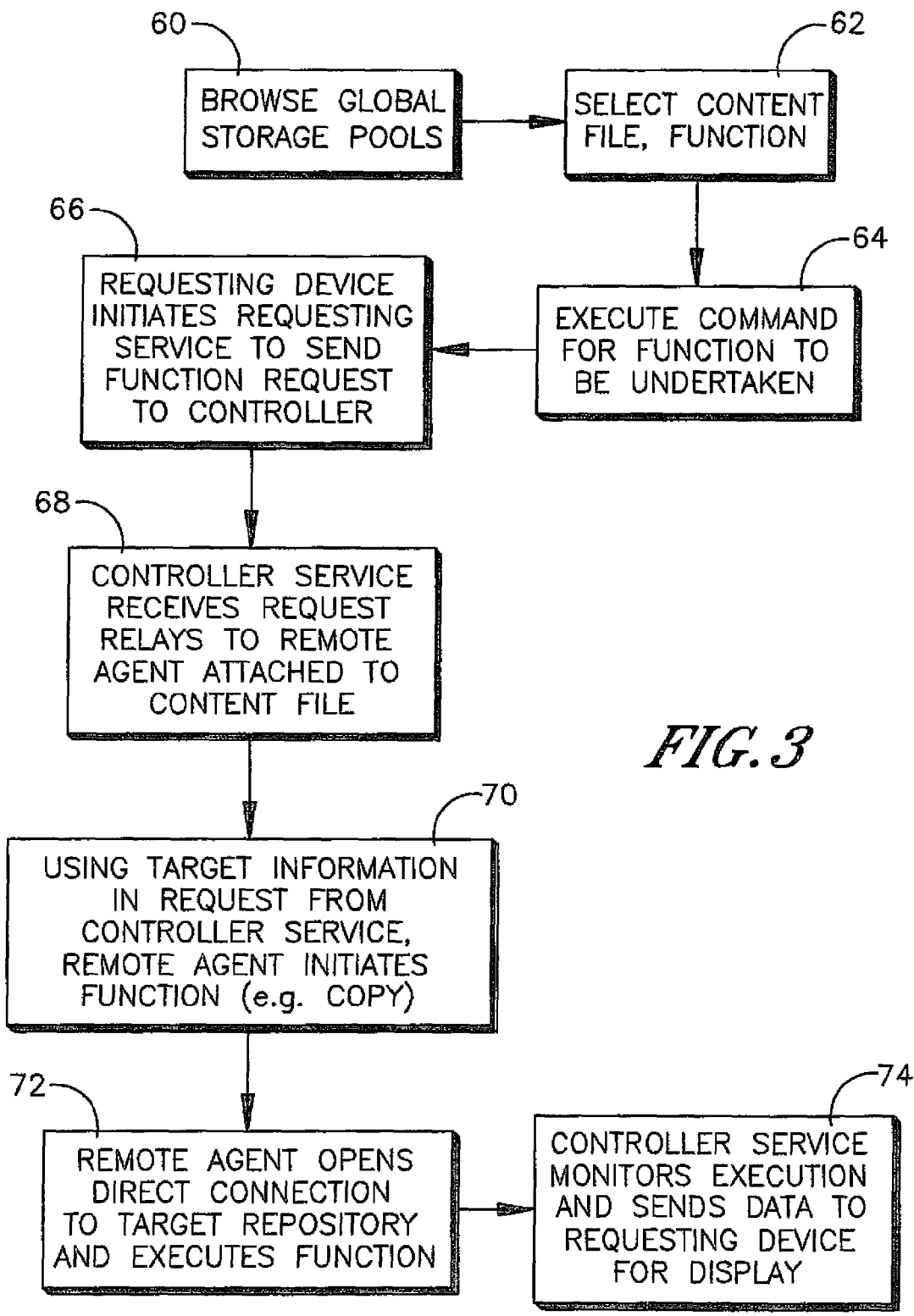
FIG. 3 is a flow chart showing example logic according to present principles.
Figure 4:
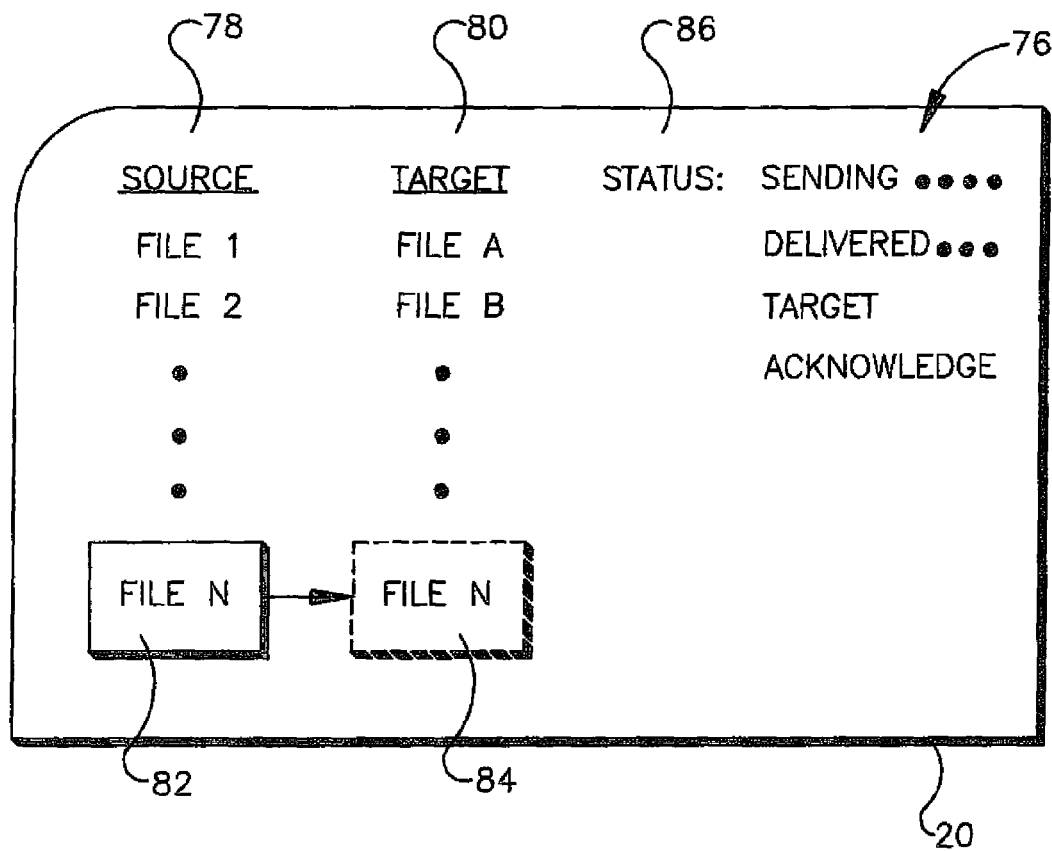
FIG. 4 is a screen shot of a sample monitoring presentation.

FIG. 2 shows example software architecture that may be used in the execution of the logic shown in FIG. 3. A web interface 44 may execute on the requesting device 12. An example user interface (UI) that the web interface can present on the display 20 of the requesting device 12 is illustrated in FIG. 4.

Remote agents 46, 48 respectively execute on the source repository 26 and target repository 36. The remote agents 46, 48 may be attached to content files stored on the repositories 26, 36. As discussed further below, files sought by the requesting device 12 to be transferred or copied from the source repository 26 to the target repository 36 are sent directly from the source repository 26 to the target repository 36 as indicated by the line 50, without going through the requesting device 12.

On the other hand, control messages to effect such file transfer or copying are sent from the web interface 44 of the requesting device 12 to a controller module 52, which may be implemented as a servlet. The controller module 52 in turn causes the desired operation to be executed by communicating with the remote agents 46, 48 of the source repository 26 and target repository 36. The controller module 52 may be implemented on a computing device, such as but not limited to one of the computing devices shown in FIG. 1. As indicated by the line 54, only control information is exchanged between the web interface 44 of the requesting device 12 and the controller 52. Also, as indicated by the lines 56, 58, only control messages are exchanged between the controller 52 and the remote agents 46, 48 of the source repository 26 and target repository 36. The actual content file to be transferred is not exchanged between the controller 52 and the other agents/interfaces.

With the architecture of FIG. 2 in mind, attention is now directed to FIG. 3. Commencing at block 60, a user of the requesting device 12 can browse content on global storage pools, such as the source repository 26 and target repository 36. At block 62 a content file may be selected on, e.g., the source repository 26 and then at block 64 the user may enter a command to be executed to undertake a function, such as copying the file to another repository such as the target repository 36. In one example, the command to copy is entered by a user dragging and dropping the name or icon associated with the target file from a list associated with the source repository 26 to a list associated with the target repository 36, as shown in FIG. 4 and discussed further below.

Proceeding to block 66, the requesting device 12 initiates a requesting service in its web interface 44 to send the function request (e.g., a copy request) to the controller 52. A service in the controller 52 receives the request at block 68 and relays the request to the remote agent 46 of the source repository 26. Recall that the remote agent 46 may reside on the target file. This request includes information pertaining to the target repository 36. For example, responsive to the user dragging and dropping a file "on" a target repository, the requesting service in the web interface 44 accesses an underlying address of the target repository, including that address in the request to the controller 52, which then forwards the address to the remote agent 46 of the source repository 26.

Moving to block 70, using the information in the request from the controller 52, the remote agent 46 of the source repository 26 initiates the requested function (e.g., file copy or file transfer) and at block 72 opens a direct communication path 50 (FIG. 2) to the target repository 36, bypassing the requesting device 12. The function, e.g., file copy or transfer, is then executed between the source repository 26 and target repository 36 without passing through the requesting device 12. However, at block 72 the controller 52 monitors the activity between the source repository 26 and target repository 36, reporting information regarding this activity to the requesting device 12 for presentation on the display 20 of the requesting device 12.

FIG. 4 shows an example UI 76 that may be presented on the display 20 according to the logic above. As shown, a source repository column 78 and target repository column 80 may be presented listing content file names respectively stored on the repositories. A user may attach a file 82 in the source column 78 and drag and drop it to a location 84 in the target column 80 to cause the above-discussed file transfer direct from source to repository to commence, by passing the requesting device 12. The status 86 of the function execution as reported by the controller 52 at block 72 in FIG. 3 is presented on the display 20, e.g., "sending" when file transmission starts (as reported to the controller 52, e.g., by the source repository 26), "delivered" when the transfer is complete (as reported to the controller 52, e.g., by the source repository 26), and "acknowledged" when the target repository acknowledges (through the controller 52) that it has successfully received the file.

While the particular DIRECT FILE TRANSFER WITHOUT SENDING REQUESTED FILE THROUGH REQUESTING DEVICE is shown and described in detail, it is to be understood that the subject matter which is encompassed by the present invention is limited only by the claims.

What is claimed is:

1. A requesting device, comprising:
   a computer processor;
   a display controlled by the computer processor; and
   a computer readable storage medium accessible to the computer processor and bearing instructions which when executed by the computer processor to case the computer processor to:
   execute a web interface to browse one or more content files on a source repository and a target repository, the source repository and the target repository being geographically separate from each other;
   receive a user command to copy or transfer a content file of the one or more content files on the source repository to the target repository,
   wherein, in order to execute the user command, an address of the target repository is accessed without opening the source repository; and
   responsive to the user command, send to a controller a control message to transfer the content file on the source repository to the target repository, the controller communicating with respective remote agents executing on the source repository and the target repository based on the control message to cause a direct communication path to be established between source repository and the target repository for the content file to be transferred directly from the source repository to the target repository without the content file passing through the requesting device.

2. The requesting device of claim 1, wherein the remote agents are attached to the one or more content files stored on the source repository and the target repository.

3. The requesting device of claim 1, wherein the computer processor when executing the instructions is configured such that control message to effect transfer or copying of the content file are sent from the web interface of the requesting device to a controller module.

4. The requesting device of claim 3, wherein the control message is exchanged between the web interface of the requesting device and the contoller, the content file to be transferred not being exchanged between the controller and the requesting device.

5. The requesting device of claim 1, wherein the controller is implemented as a servlet.

6. The requesting device of claim 1, wherein the controller is implemented on the requesting device.

7. The requesting device of claim 1, wherein the controller is not implemented on the requesting device.

8. The requesting device of claim 1, wherein the user command to copy or transfer the content file of the one or more content files is entered by dragging and dropping a name or an icon associated with the content file.

9. The requesting device of claim 1, wherein the control message comprises the address of the target repository.

10. A method, comprising:
receiving a user command from a requesting device, to execute a function of the transferring a content file of a source repository to a target repository, along with an address of the target repository,
wherein the address of the target repository is accessed by the requesting device, in response to the user command;
sending a message including the accessed address of the target repository to a remote agent of the source repository;
the message commanding the remote agent of the source repository to execute the function of transferring the content file of the source repository to the accessed address of the target repository;
the message causing the remote agent to open a direct communication path between the source repository and the target repository, bypassing the requesting device; and
the function of transferring the content file being executed between the source repository and target repository through the direct communication path without the content file passing through the requesting device.

11. The method of claim 10, wherein the remote agent of the source repository resides on the content file.

12. The method of claim 10, wherein the function is a file copy.

13. The method of claim 10, further comprising monitoring activity, between the source repository and target repository, reporting information regarding the monitoring activity to the requesting device.

14. A requesting device, comprising:
a computer processor;
a display controlled by the computer processor; and
a computer readable storage medium accessible to the computer processor and bearing instructions which when executed by the computer processor to cause the computer processor to:
present on the display a user interface (UI), the UI being configured to enter a command to copy or transfer a content file from a source repository to a target repository, the source repository and the target repository being geographically separate from each other; and
responsive to the command, send to a controller a control massage to transfer the content file on the source repository to the target repository, the controller communicating with respective remote agents executing on the source repository and the target repository based on the control message to cause a direct communication path to be established between source repository and the target repository for the content file to be transferred directly from the source repository to the target repository without the content file passing through the requesting device.

15. The requesting device of claim 14, wherein the UI includes a source repository data structure and a target repository data structure listing one or mare content file names respectively stored on the source repository and the target repository.

16. The requesting device of claim 15, comprising an input device configured to enable a user to attach a file in the source repository data structure and drag and drop the content file to a location in the target repository data structure to cause the content file to be transferred or copied directly from the source repository to the target repository, bypassing the requesting device.

17. The requesting device of claim 14, wherein the UI includes a status of function execution as reported by the controller communicating with the computer processor.

18. The requesting device of claim 17, wherein the status includes "sending" to indicate the content file transmission between the source repository and target repository has commenced.

19. The requesting device of claim 17, wherein the status includes "delivered" to indicate the content file transmission between the source repository and target repository is complete.

20. The requesting device of claim 17, wherein the status includes "acknowledged" to indicate that the target repository has acknowledged that the content file is successfully received.

* * * * *